(12) United States Patent
Krause et al.

(10) Patent No.: US 7,784,839 B2
(45) Date of Patent: Aug. 31, 2010

(54) TUBE JOINT AND COMPONENT ARRANGEMENT WITH TUBE JOINT

(75) Inventors: Michael Krause, Albershausen (DE); Arthur Wieland, Wolfschlugen (DE)

(73) Assignee: J. Eberspächer GmbH & Co. KG, Esslingen (DE)

(*) Notice: Subject to any disclaimer, the term of this patent is extended or adjusted under 35 U.S.C. 154(b) by 13 days.

(21) Appl. No.: 12/174,005

(22) Filed: Jul. 16, 2008

(65) Prior Publication Data
US 2009/0021004 A1 Jan. 22, 2009

(30) Foreign Application Priority Data
Jul. 17, 2007 (DE) .................... 10 2007 033 658

(51) Int. Cl.
*F16L 17/00* (2006.01)
(52) U.S. Cl. ...................... 285/365; 285/364
(58) Field of Classification Search ............ 285/364, 285/365, 424
See application file for complete search history.

(56) References Cited

U.S. PATENT DOCUMENTS

| | | | | |
|---|---|---|---|---|
| 2,439,254 A | * | 4/1948 | Levin | 285/325 |
| 2,926,936 A | * | 3/1960 | Lanier et al. | 285/325 |
| 3,473,829 A | * | 10/1969 | Daniels | 285/18 |
| 3,630,549 A | * | 12/1971 | Grimm | 285/296.1 |
| 3,669,474 A | * | 6/1972 | Bode | 285/336 |
| 3,791,681 A | * | 2/1974 | Moldow | 285/233 |
| 5,135,270 A | * | 8/1992 | Arnoldt et al. | 285/363 |
| 6,481,911 B1 | * | 11/2002 | Streuber | 403/5 |
| 2004/0262922 A1 | * | 12/2004 | Andersson | 285/365 |
| 2008/0093844 A1 | | 4/2008 | Casey, Sr. et al. | |

FOREIGN PATENT DOCUMENTS

WO WO 98/29679 7/1998
WO WO 2006/114780 11/2006

* cited by examiner

*Primary Examiner*—Aaron M Dunwoody
(74) *Attorney, Agent, or Firm*—McGlew and Tuttle, P.C.

(57) ABSTRACT

A joint (1), especially of an exhaust system is provided for two axially adjacent ends (2, 3) of a tubular body (4, 5), respectively. Each tube end (2, 3) has a ring collar (8, 9) projecting radially outwards. A centering ring (6) is arranged axially between the tube ends (2, 3) and which has a plurality of collar segments (17) in the radial outward direction. Some of the collar segments (17a) project axially on one side of the centering ring (6) and axially overlap the ring collar (8) of one tube end (2), while the other collar segments (17b) project axially on the other side of the centering ring (6) and axially overlap the ring collar (9) of the other tube end (3) in the radial outward direction. A clamp (7) axially and radially overlaps the ring collar (8, 9) and the centering ring (6) in the radial outward direction.

20 Claims, 3 Drawing Sheets

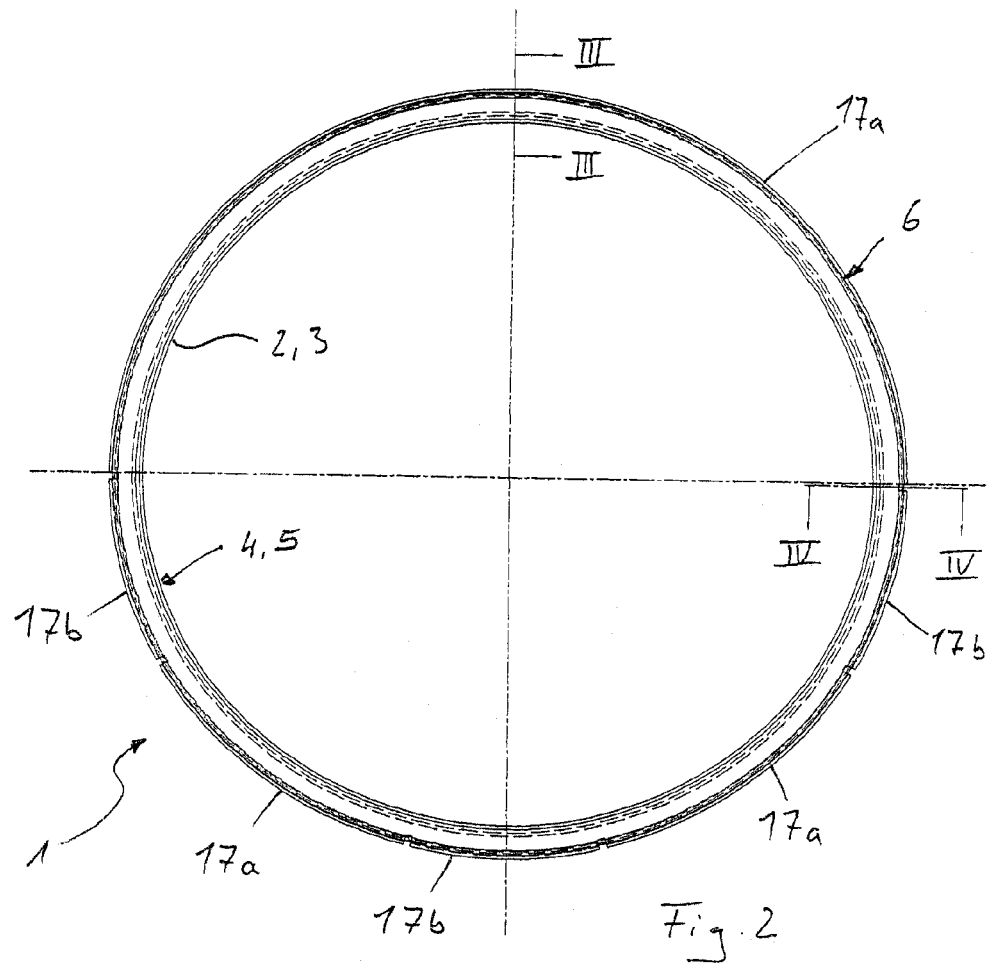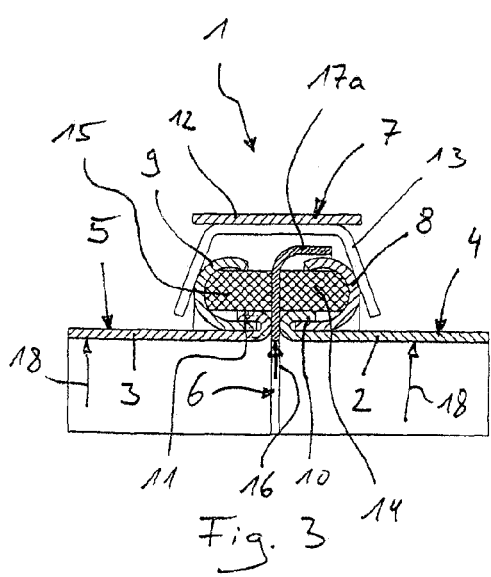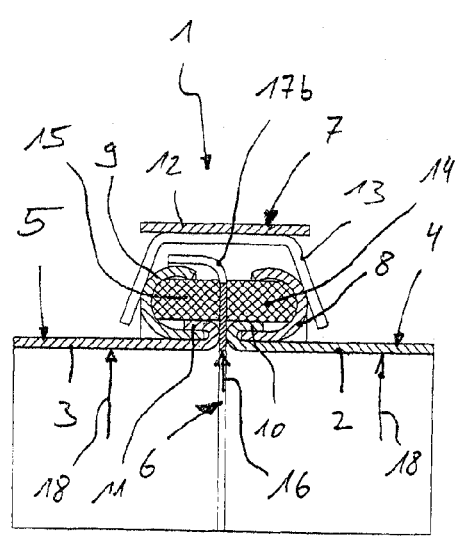

TUBE JOINT AND COMPONENT ARRANGEMENT WITH TUBE JOINT

CROSS REFERENCE TO RELATED APPLICATIONS

This application claims the benefit of priority under 35 U.S.C. §119 of German Patent Application DE 10 2007 033 658.8 filed Jul. 17, 2007.

FIELD OF THE INVENTION

The present invention pertains to a joint for two axially adjacent ends of a tubular body, especially of an exhaust system. Moreover, the present invention pertains to a component arrangement, and especially an exhaust system, in which a component, which has tubular end sections, is fastened at these end sections with such a tube joint at each tube end.

BACKGROUND OF THE INVENTION

In certain component arrangements, e.g., in an exhaust system, especially of an internal combustion engine, it may be necessary to connect a flowable component with a supplying tube and with an exhaust tube. For example, it is desirable in exhaust systems to be able to remove a particle filter from the exhaust line, for example, in order to be able to replace or clean the respective particle filter element. Simple manageability with sufficient operating safety with regard to leakproofness and temperature resistance is desired here.

SUMMARY OF THE INVENTION

An object of the present invention is to provide an improved embodiment for a joint and for a component arrangement of the type mentioned in the introduction, which is especially characterized by a simplified mounting and removal.

According to the invention, a joint is provided for two axially adjacent ends of a respective tubular body, and especially of an exhaust system, whereby each tube end has a ring collar projecting radially outwards and a centering ring. The centering ring is arranged axially between the tube ends and has a plurality of collar segments in the radial outward direction. Some of the collar segments project axially on one side of the centering ring and axially overlap the ring collar of the one tube end in the radial outward direction, the other collar segments project axially on the other side of the centering ring and axially overlap the ring collar of the other tube end in the radial outward direction. A clamp is provided, which axially and radially overlaps the ring collar and the centering ring in the radial outward direction.

The present invention is based on the general idea of equipping the respective tube joint with the centering ring, which is arranged axially between the tube ends to be connected to one another and which has a plurality of collar segments in the radial outward direction, some of which project axially on one side of the centering ring and the others of which project axially on the other side of the centering ring. Moreover, the clamp is provided, which axially and radially overlaps the ring collars of the tube ends and the centering ring in the radial outward direction. The collar segments axially overlap the tube ends to be connected to one another in the radial outward direction. As a result of this, an external centering of the two tube ends to be connected to one another can be achieved. This may—depending on the embodiment—simplify the production or detachment of the respective tube joint. Since the collar segments that bring about the centering of the two tube ends are arranged outside of the gas-supplying area of the tubes, there is a reduced thermal load on the collar segments, as a result of which the joint has an increased reliability. Furthermore, the centering ring, forming a separate component with regard to the tube ends, is especially designed as a replacement part, and thus may be replaced when detaching the tube joint and when replacing the tube joint. This measure also increases the reliability of the tube joint.

According to one advantageous embodiment, the centering ring has, in an arc of 180°, either only a single collar segment or a plurality of collar segments, each projecting on the same side. This special type of construction makes it possible, in the absence of a clamp, to adjust the two axially adjacent tube ends radially in relation to one another. Consequently, it becomes possible, in case of a component that is integrated into a conduit of tubes at each of its axial ends with a tube joint of this type, to remove same radially from this conduit of tubes with opened clamps, without it being necessary to displace the tube ends, between which the respective component is integrated into the conduit of tubes, axially in relation to one another. This considerably simplifies the installation and the removal of the component in question. For example, an exhaust line can thus be removed radially from the corresponding exhaust line without the exhaust line having to be moved for this in the axial direction.

According to another advantageous embodiment, two ring-shaped sealing bodies may be provided, one of which is axially supported, on the one hand, on one ring collar and, on the other hand, on one side of the centering ring, and the other of which is axially supported, on the one hand, on the other ring collar and, on the other hand, on the other side of the centering ring. In this case, an effective gas leakproofness of the tube joint can be achieved by means of the sealing body. An embodiment, in which the sealing bodies are fastened to the centering ring, is especially advantageous. On the one hand, the mounting of the tube joint is thereby considerably simplified. On the other hand, in the design of the centering ring as a replacement part, it becomes possible to simply replace the seals of the tube joint in a simple manner when removing and remounting together with the centering ring. This measure also increases the reliability of the respective tube joint.

It is understood that the features mentioned above and those still to be explained below can be used not only in the respectively indicated combination, but also in other combinations or alone, without departing from the scope of the present invention.

Preferred exemplary embodiments of the present invention are shown in the drawings and explained in detail in the description below, whereby identical reference numbers refer to identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a schematic central cross sectional view through the joint of FIG. 1;

FIG. 3 is a schematic longitudinal sectional view, corresponding to section lines III-III in FIG. 2, through an edge area of the joint;

FIG. 4 is a schematic longitudinal sectional view corresponding to intersecting section lines IV-IV in FIG. 2, through an edge area of the joint.

DESCRIPTION OF THE PREFERRED EMBODIMENTS

Figure 1:
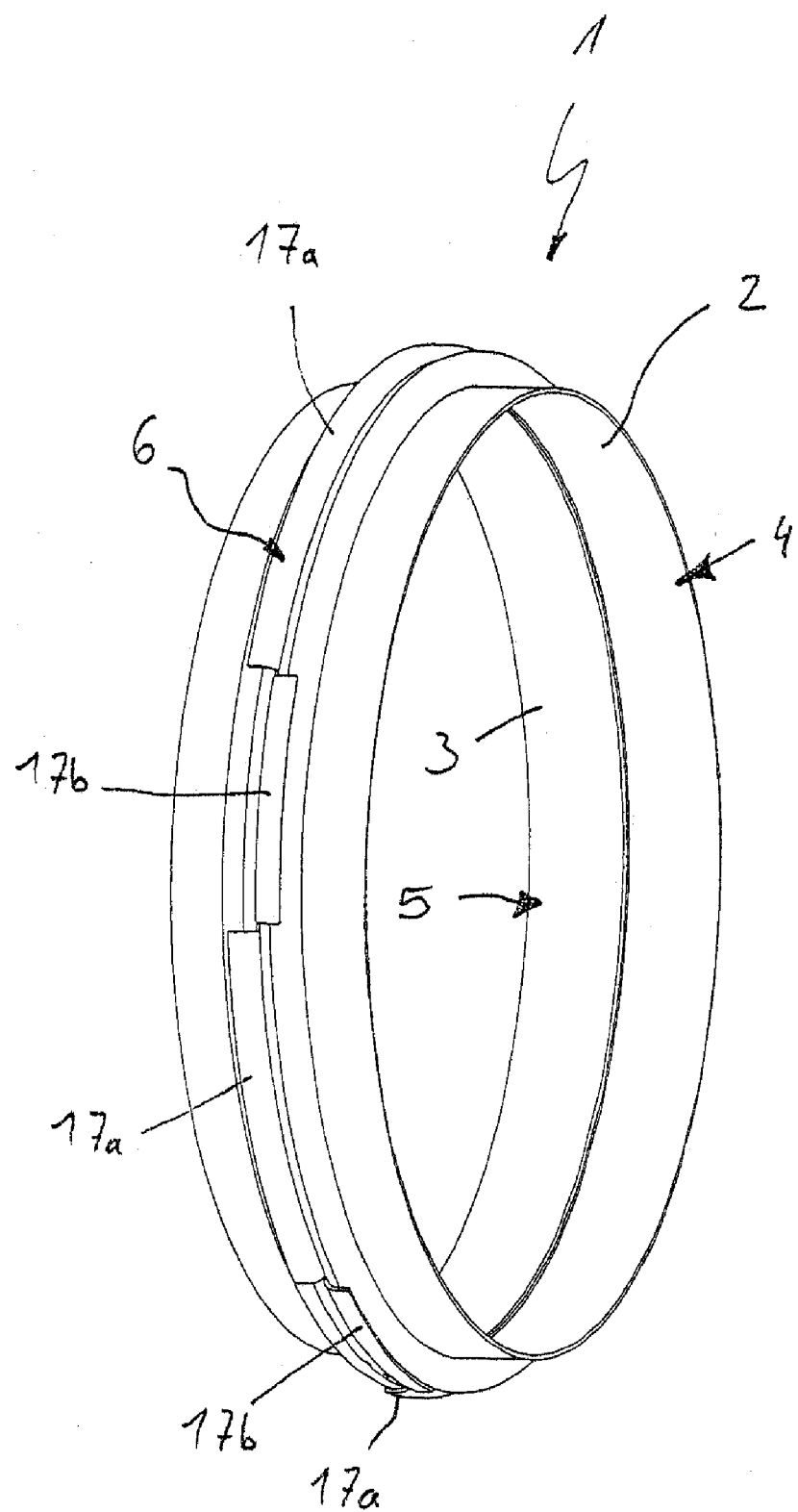
FIG. 1 is a schematic perspective view showing a joint according to the invention.

Referring to the drawings in particular, according to FIGS. 1 through 4, a joint 1, which is used to connect two axially adjacent ends 2, 3 of tubular bodies 4, 5 (shown only partly here) to one another, has a centering ring 6 as well as a clamp 7. The clamp 7 is not shown in FIGS. 1 and 2. A separating plane (not shown here), in which the two tube ends 2, 3 abut against each other, extends at right angles to the longitudinal axis of the respective tubular body 4, 5.

According to FIGS. 3 and 4, each tube end 2, 3 has a ring collar 8 and 9, respectively, projecting radially outwards. The respective ring collar 8, 9 projects radially outwards from the respective tube end 2, 3. In the preferred embodiment shown here, each respective ring collar 8, 9, with regard to the respective tube end 2, 3, is a separate component, which is attached to the respective tube end 2, 3. The respective ring collar 8, 9 has a C-shaped design in this case and arranged such that it is axially open towards the respective other tube end 2, 3. To connect the ring collar 8, 9 to the tube ends 2, 3, an end section 10 and 11, respectively, is bent back by 180° on the respective tube end 2, 3 in the radial outward direction, in such a way that a side of the C profile of the respective ring collar 8, 9 is thereby clamped at the tube end 2, 3. For example, the ring collars 8, 9 can be fastened to the tube ends 2, 3 by means of roller burnishing. In addition, the ring collars 8, 9 can be soldered to the tube ends 2, 3. Other fastening methods may also be carried out. As an alternative, it is possible as well to embody the respective ring collar 8, 9 integrally at the associated tube end 2, 3.

The centering ring 6 is arranged axially between the tube ends 2, 3. Furthermore, the centering ring 6 has a plurality of collar segments 17 in the radial outward direction. At least two collar segments 17 are present in each case. Without limiting generality, six collar segments 17 are provided in the example shown. The centering ring 6 has different collar segments 17 here. Some of the collar segments, designated by 17a, project axially on one side of the centering ring 6, while the other collar segments, designated by 17b, project on the other side of the centering ring 6. The different collar segments 17a and 17b thus project axially from the centering ring 6 in opposite directions.

As can be gathered especially from FIGS. 1 and 2, the different collar segments 17a and 17b on the centering ring 6 are embodied such that they project axially from the centering ring 6 on one side or the other in an alternating manner.

According to FIG. 3, some of the collar segments 17a overlap the ring collar 8 of the tube end 2 in the radial outward direction and in the axial direction. By contrast thereto, the other collar segments 17b overlap the ring collar 9 of the other tube end 3 in the radial outward direction and in the axial direction. Consequently, a radial centering or axial alignment of the two tube ends 2, 3 in relation to one another is produced, whereby the centering on the ring collar 8, 9 takes place in the radial outward direction.

According to FIGS. 3 and 4, the clamp 7 is embodied such that it overlaps the ring collars 8, 9 and centering ring 6 in the radial outward direction in the axial direction and in the radial direction. To this end, the clamp 7 has, for example, a tightening strap 12, which can be tightened by means of a corresponding tightening means (not shown here) in the circumferential direction, as well as at least one holding element 13, having a U-shaped or tub-shaped profile, which overlaps the ring collars 8, 9 and rests on same. Preferably, the clamp 7 is embodied such that the tensile stress introduced into the tightening strap 12 can be converted via at least one holding element 13 into an axial prestress, which prestresses the two tube ends 2, 3 over the two ring collars 8, 9 axially towards one another.

According to FIG. 2, according to the preferred embodiment shown here, the centering ring 6 is embodied such that it has, in an arc of 180°, which corresponds in FIG. 2 to the upper half of the cross section shown, only a single circular collar segment 17, the circular collar segment 17a here, which extends continuously over about 180°. As an alternative, it is also possible to embody the centering ring such that it has, in the 180° arc, a plurality of collar segments 17, all of which, however, project from the centering ring 6 on the same side. In this variant, the 180° arc contains either only collar segments 17a or only collar segments 17b. This embodiment makes it possible to adjust the two tube ends 2, 3 in relation to one another in the radial direction in the absence of a clamp 7. This simplifies the mounting and removal or the creation and detachment of the tube joint 1.

According to FIGS. 3 and 4, the tube joint 1 may preferably have two ring-shaped sealing bodies 14, 15. One sealing body 14 is axially supported, on the one hand, on one ring collar 8, and, on the other hand, on one side of the centering ring 6. In addition, this sealing body 14 may also be supported radially at the tube end 2, here on the bent-back end section 10. The other sealing body 15 is axially supported, on the one hand, on the other ring collar 9, and, on the other hand, on the other side of the centering ring 6. In addition, this sealing body may also be supported radially at the respective tube end 3, here on the bent-back end section 11. Preferably, the respective sealing body 14, 15 is fastened to the centering ring 6. For example, the sealing bodies 14, 15 are glued to the centering ring 6 or vulcanized thereon or injection molded thereon within the framework of their manufacture. The ring collars 8, 9 here preferably have each a profile open towards the centering ring 6, e.g., a C profile or a U profile. The respective sealing body interlocks into the respective ring collar 8, 9 through the open side of the profile. Consequently, this results in an especially stable support for the respective sealing body 14, 15 within the respective ring collar 8, 9.

In the embodiment shown here, the centering ring 6 according to FIGS. 3 and 4 has an inner cross section 16, which is dimensioned such that the tube ends 2, 3 are not supported on one another, but on the centering ring 6. The inner cross section 16 of the centering ring 6 is preferably dimensioned approximately the same size as an inner cross section 18 of the respective tube end 2, 3. The gas flow in the respective tube system is consequently not affected or is affected only slightly.

Figure 5:
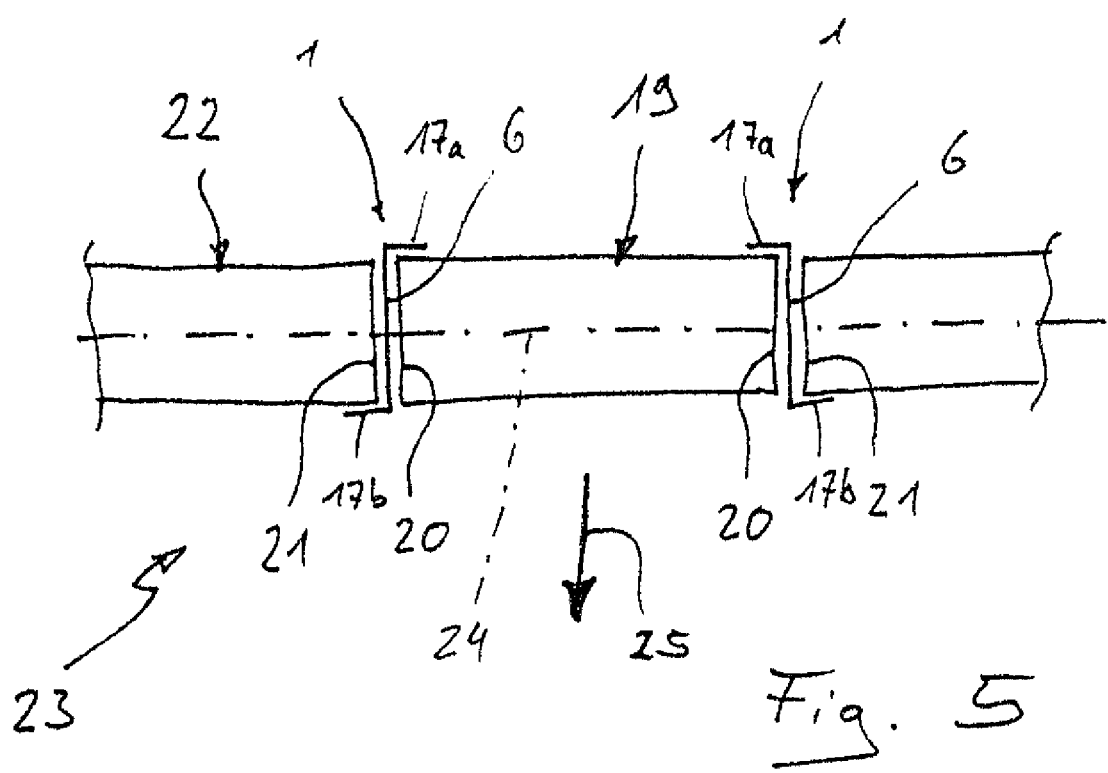
FIG. 5 is a schematic highly simplified, general side view of a component arrangement according to the invention.

According to FIG. 5, the tube joint 1 described above which is indicated in FIG. 5 essentially by the centering ring 6 shown in a highly simplified manner, can be used for mounting a component 19 on each of the tubular end sections 20 on one tube end 21 of a conduit of tubes 22 in a detachable manner. The component 19 is thereby integrated into the conduit of tubes 22 and forms together with same a component arrangement 23. For example, the component arrangement 23 is an exhaust system of an internal combustion engine. For example, the component 19 is a particle filter or any other replaceable component to be integrated that is installed in an exhaust line, here in the conduit of tubes 22. According to the present invention, the two joints 1, with which the component 19 is installed into the conduit of tubes 22 in an axial section of the component arrangement 23, are embodied such that the two centering rings 6 are arranged in a mirror symmetrical manner with regard to a plane of symmetry running at right angles to the axial direction 24. The centering rings 6 are oriented here such that the respective 180° arcs have approximately the same direction with regard to their position of rotation, and that the collar segments 17a of these 180° arcs project from the respective centering ring 6 towards one another. As an alternative, the centering rings 6 may also be arranged such that the collar segments 17a of these 180° arcs project from the respective centering ring 6 away from one another. This type of construction makes it possible to remove component 19 from the conduit of tubes 22, with detached clamps 7, in the radial direction, i.e., corresponding to arrow 25, with or without the centering rings 6. In this case, especially no axial adjustment of the two tube ends 21 of the conduit of tubes 22 is necessary, which considerably simplifies the removal and installation of the component 19. Analogously thereto, component 19 may, for its installation, be moved radially into the gaps between the tube ends 21 in a direction opposite arrow 25.

While specific embodiments of the invention have been shown and described in detail to illustrate the application of the principles of the invention, it will be understood that the invention may be embodied otherwise without departing from such principles.

What is claimed is:

1. An exhaust system joint comprising:
   two axially adjacent tube ends, each tube end having a ring collar projecting radially outwards and having a profile forming a receiving space open in the direction of the opposite said axially adjacent tube end;
   a centering ring arranged axially between the tube ends, said centering ring having a plurality of collar segments in a radial outward direction, wherein:
      some of said collar segments project axially on one side of said centering ring and axially overlap said ring collar of one tube end in the radial outward direction; and
      other collar segments project axially on another side of said centering ring and axially overlap said ring collar of another tube end in the radial outward direction;
   a clamp axially and radially overlapping said ring collars and said centering ring in the radial outward direction and acting on said ring collars with an axial clamping force; and
   two ring-shaped sealing bodies, one of said sealing bodies being axially supported in said receiving space against said ring collar of one of said tube ends, on one side of said centering ring, and the other of said ring-shaped sealing bodies being axially supported in said receiving space against said ring collar of another of said tube ends, on another side of said centering ring.

2. A joint in accordance with claim 1, wherein said centering ring has, in an arc segment of 180°, a single collar segment projecting on a same side or a plurality of collar segments each project on the same side.

3. A joint in accordance with claim 1, wherein each of said sealing bodies are fastened to said centering ring.

4. A joint in accordance with claim 1, wherein said receiving space of each of said ring collars has a profile open towards said centering ring, said respective sealing body contacting an inner surface of said profile and being interlocked between said centering ring and said inner surface of said profile.

5. A joint in accordance with claim 1, wherein:
   at least one of said ring collars comprises a separate component from said respective tube end and is attached at the respective tube end by roller burnishing.

6. A joint in accordance with claim 1, wherein:
   an inner cross section of said centering ring is dimensioned such that the tube ends are axially supported at said centering ring, and
   an inner cross section of said centering ring is dimensioned approximately the same size as the inner cross sections of the tube ends.

7. A joint in accordance with claim 1, wherein the collar segments project axially on one side and on the other side of said centering ring in an alternating manner.

8. An exhaust system component arrangement comprising:
   a component with a first tubular end section having a first ring collar projecting radially outwardly with a curved profile forming a receiving space open in an axial outward direction and a second tubular end section having a second ring collar projecting radially outwardly with a curved profile forming a receiving space open in an axial outward direction;
   a first tube with a first tube end having a first tube ring collar projecting radially outwardly with a curved profile forming a receiving space open in an axial outward direction;
   a first joint centering ring;
   a first ring-shaped sealing body in said receiving space of said first ring collar on one side of said first joint centering ring;
   a first tube ring-shaped sealing body in said receiving space of said first tube ring collar on another side of said first joint centering ring;
   a first joint clamp, said first tubular end section, said first tube, said first joint centering ring and said first joint clamp cooperating to form a first joint with said first joint centering ring arranged axially between said first tubular end section and said first tube, said centering ring having a plurality of collar segments in a radial outward direction, wherein some of said collar segments project axially on one side of said centering ring and axially overlap said ring collar of said first tube end in the radial outward direction and other of said collar segments project axially on another side of said first joint centering ring and axially overlap said first ring collar of said first tubular end section in the radial outward direction, said first joint clamp axially overlapping said first ring collar of said first tubular end section and said first centering ring in the radial outward direction and acting on said first ring collar and said first tube ring collar with an axial clamping force to interlock said first ring-shaped sealing body in said receiving space of said first ring collar and in contact with an inner surface of said profile section of said first ring collar and a surface of said first joint centering ring and to interlock said first tube ring-shaped sealing body in said receiving space of said first tube ring collar and in contact with an inner surface of said profile section of said first tube and another surface of said first joint centering ring;
   a second tube with a second tube end having a second tube ring collar projecting radially outwardly with a curved profile forming a receiving space open in an axial outward direction;
   a second joint centering ring;

a second ring-shaped sealing body in said receiving space of said second ring collar on one side of said second joint centering ring;
a second tube ring-shaped sealing body in said receiving space of said second tube ring collar on another side of said second joint centering ring;
a second joint clamp, said second tubular end section, said second tube, said second joint centering ring and said second joint clamp cooperating to form a second joint with said second joint centering ring arranged axially between said second tubular end section and said second tube, said second joint centering ring having a plurality of collar segments in a radial outward direction, wherein some of said collar segments project axially on one side of said second joint centering ring and axially overlap said ring collar of said second tube end section in the radial outward direction and other of said collar segments project axially on another side of said second joint centering ring and axially overlap said second ring collar of said second tubular end section in the radial outward direction, said second joint clamp axially overlapping said second ring collar of said second tubular end section and said second joint centering ring in the radial outward direction and acting on said second ring collar and said second tube ring collar with an axial clamping force to axially support and interlock said second ring-shaped sealing body in said receiving space of said second ring collar and in contact with an inner surface of said profile section of said second ring collar and a surface of said second joint centering ring and to axially support and interlock said second tube ring-shaped sealing body in said receiving space of said second tube ring collar and in contact with an inner surface of said profile section of said second tube and another surface of said second joint centering ring.

9. An exhaust system component arrangement in accordance with claim 8, wherein each said centering ring has, in an arc segment of 180°, a single collar segment projecting on a same side or said plurality of collar segments each project on the same side.

10. An exhaust system component arrangement in accordance with claim 9, whereby the centering rings of both said first joint and said second joint are oriented such that the respective 180° arcs have approximately identical directions with regard to their rotary position and such that the collar segments of these 180° arcs project from the respective centering ring either towards one another or away from one another.

11. An exhaust system component arrangement in accordance with claim 10, wherein
said first ring-shaped sealing body is in contact with an end surface of said component and said first ring-shaped sealing body is in contact with an inner surface of said curved profile of said first end of said component opposite said contact with an end surface of said component;
said first tube ring-shaped sealing body is in contact with an end surface of said first tube and said first tube ring-shaped sealing body is in contact with an inner surface of said curved profile of said first tube opposite said contact with an end surface of said first tube;
said second ring-shaped sealing body is in contact with another end surface of said component and said second ring-shaped sealing body is in contact with an inner surface of said curved profile of said second end of said component opposite said contact with a second end surface of said component; and said second tube ring-shaped sealing body is in contact with an end surface of said second tube and said second tube ring-shaped sealing body is in contact with an inner surface of said curved profile of said second tube opposite said contact with an end surface of said second tube.

12. An exhaust system component arrangement in accordance with claim 10, wherein:
at least one of said ring collars comprises a separate component from said respective tube end and is attached at the respective tube end by roller burnishing.

13. An exhaust system component arrangement in accordance with claim 10, wherein:
an inner cross section of said centering ring is dimensioned such that the tube ends are axially supported at said centering ring, and
an inner cross section of said centering ring is dimensioned approximately the same size as the inner cross sections of the tube ends.

14. An exhaust system component arrangement in accordance with claim 10, wherein the collar segments project axially on one side and on the other side of said centering ring in an alternating manner.

15. An exhaust system component arrangement in accordance with claim 11, wherein said sealing bodies are fastened to said centering ring.

16. An exhaust system joint comprising:
a first tube with a first tube end having a radially outwardly facing first tube end surface and having a first ring collar projecting radially outwards with a first ring collar profile with an inner surface with a radially outer portion facing the first tube end surface and with a side portion facing a first tube axially outward direction, the first ring collar profile forming a first receiving space open in the first tube axial outward direction;
a second tube with a second tube end having a radially outwardly facing second tube end surface and having a second ring collar projecting radially outwards with a second ring collar profile with an inner surface with a radially outer portion facing the second tube end surface and with a side portion facing a second tube axially outward direction, the second ring collar profile forming a second receiving space open in the second tube axial outward direction, said first tube end being axially adjacent to said second tube end;
a centering ring arranged axially between said first tube end and said second tube end, said centering ring having a plurality of collar segments extending in a radial outward direction, some of said collar segments projecting axially on one side of said centering ring and axially overlapping said ring collar of one tube end in the radial outward direction and other collar segments projecting axially on another side of said centering ring and axially overlapping said ring collar of another tube end in the radial outward direction;
a first sealing body in said first receiving space;
a second sealing body in said second receiving space; and
a clamp axially and radially overlapping said ring collars and said centering ring in the radial outward direction and acting on said first ring collar and said second ring collar with an axial clamping force to axially support and interlock said first sealing body in said first receiving space in contact with each of said first ring collar profile inner surface radially outer portion, said first ring collar profile inner surface side portion and said radially outwardly facing first tube end surface and to axially support and interlock said second ring-shaped sealing body in said second receiving space in contact with each of said second ring collar profile inner surface radially outer portion, said second ring collar profile inner surface side portion and said radially outwardly facing second tube end surface.

17. A joint in accordance with claim 16, wherein said centering ring has, in an arc segment of 180°, a single collar segment projecting on a same side or a plurality of collar segments each project on the same side.

18. A joint in accordance with claim 16, wherein said first sealing body is fastened to a surface of said centering ring and said second sealing body is fastened to an opposite surface of said centering ring and said first ring collar is connectable and disconnectable from said first tube and said second ring collar is connectable and disconnectable from said second tube.

19. A joint in accordance with claim 16, wherein said clamp acts directly on said first ring collar and directly on said second ring collar without contacting said centering ring.

20. A joint in accordance with claim 19, wherein:
each of said first ring collar and said second ring collar comprises a separate component from said respective tube end and is attached at the respective tube end by roller burnishing.

* * * * *